US009203861B2

(12) United States Patent
Albanese et al.

(10) Patent No.: US 9,203,861 B2
(45) Date of Patent: Dec. 1, 2015

(54) METHODS AND SYSTEMS FOR DETERMINING HARDENING STRATEGIES

(71) Applicant: GEORGE MASON UNIVERSITY, Farifax, VA (US)

(72) Inventors: Massimiliano Albanese, Potomac, MD (US); Sushil Jajodia, Oakton, VA (US); Steven Noel, Woodbridge, VA (US)

(73) Assignee: GEORGE MASON UNIVERSITY, Fairfax, VA (US)

( * ) Notice: Subject to any disclaimer, the term of this patent is extended or adjusted under 35 U.S.C. 154(b) by 14 days.

(21) Appl. No.: 13/924,119

(22) Filed: Jun. 21, 2013

(65) Prior Publication Data
US 2014/0173740 A1 Jun. 19, 2014

Related U.S. Application Data

(60) Provisional application No. 61/738,528, filed on Dec. 18, 2012.

(51) Int. Cl.
G06F 11/00 (2006.01)
G06F 12/14 (2006.01)
G06F 12/16 (2006.01)
G08B 23/00 (2006.01)
H04L 29/06 (2006.01)
G06F 21/57 (2013.01)

(52) U.S. Cl.
CPC .......... H04L 63/1433 (2013.01); G06F 21/577 (2013.01); H04L 63/1441 (2013.01)

(58) Field of Classification Search
CPC .................................................. H04L 63/1433
See application file for complete search history.

(56) References Cited

U.S. PATENT DOCUMENTS

2006/0085858 A1* 4/2006 Noel et al. ...................... 726/25

OTHER PUBLICATIONS

Wang et al., Minimum-cost network hardening using attack graphs, 2006, Elsevier, pp. 3812-3824.*
Sheyner et al., Automated Generation and Analysis of Attack Graphs, 2002, IEEE.*
Wang et al., Implementing interactive analysis of attack graphs using relational databases, 2008, IOS Press.*
Sushil Jajodia et al., "Cauldron: Mission-Centric Cyber Situational Awareness with Defense in Depth", In Proceedings of the Military Communications Conference (MILCOM 2011), Nov. 2011 (6 pages).

(Continued)

Primary Examiner — Mohammad W Reza
Assistant Examiner — Trong Nguyen
(74) Attorney, Agent, or Firm — Eckert Seamans Cherin & Mellott, LLC; Carol A. Marmo

(57) ABSTRACT

A system and method for determining at least one hardening strategy to prevent at least one attack, comprising: performing processing associated with obtaining at least one attack graph, the at least one attack graph comprising at least one goal condition, at least one initial condition, and at least one exploit; performing processing associated with obtaining at least one allowable action that disables the at least one initial condition; performing processing associated with obtaining costs associated with the at least one allowable action; and performing processing associated with utilizing the at least one allowable action to determine at least one recommended strategy from the at least one allowable action taking into account the costs.

14 Claims, 9 Drawing Sheets

(56) References Cited

OTHER PUBLICATIONS

Steven Noel et al., "Managing Attack Graph Complexity Through Visual Hierarchical Aggregation", ACM CCS Workshop on Visualization and Data Mining for Computer Secuirty'04, pp. 109-118, Oct. 29, 2004.

"Nessus Vulnerability Scanner", downloaded from http://www.tenable.com/products/nessus on Nov. 20, 2013 (10 pages).

Lingyu Wang et al., "Minimum-Cost Network Hardening Using Attack Graphs", Computer Communications, vol. 29, pp. 3812-3824, Nov. 2006.

Paul Ammann et al., "Scalable, Graph Based Network Vulnerability Analysis", Proceedings of the 9th ACM Conference on Computer and Communications Security (CCS 2002), pp. 217-224, Nov. 18-22, 2002.

Sushil Jajodia et al., "Managing Cyber Threats: Issues, Approaches, and Challenges: Ch. 5: Topological Analysis of Network Attack Vulnerability", pp. 247-266, Spring 2005.

Rodolphe Ortalo et al., "Experimenting with Quantitative Evaluation Tools for Monitoring Operational Security", IEEE Transactions on Software Engineering, vol. 25, No. 5, pp. 633-650, Sep./Oct. 1999.

Cynthia Phillips et al., "A Graph-Based System for Network-Vulnerability Analysis", In Proceedings of the New Security Paradigma Workshop (NSPW 1998), pp. 71-79, Sep. 1998.

Ronald W. Ritchey et al., "Using Model Checking to Analyze network Vulnerabilities" In Proceedings of IEEE Symposium on Security and Privacy 2000, pp. 156-165, May 14-17, 2000.

Ronald Ritchey et al., "Representing TCP/IP Connectivity for Topological Analysis of Network Security", In Proceesings of the 18th Annual Computer Security Applications Conference 2002, pp. 25-31 (2002).

Oleg Sheyner et al., "Automated Generation and Analysis of Attack Graphs", In Proceedings of the 2002 IEE Symposium on Security and Privacy (S&P 2002), pp. 273-284, May 2002.

L.P. Swiler et al., "Computer-Attack Graph Generation Tool" In Proceedings of the DARPA Information Survivability Conference & Exposition li (DISCEX 2001), pp. 307-321, Jun. 2001.

Dan Zerkle et al., "NetKuang—A Multi-Host Configuration Vulnerability Checker", In Proceedings of the 6th USENIX Security Symposium, Jul. 1996 (10 pages).

C.R. Ramakrishnan et al., "Model-Based Analysis of Configuration Vulnerabilities", Journal of Computer Security, vol. 10, No. 1-2, pp. 189-209 (2002).

S. Jha et al., "Two Formal Analyses of Attack Graphs", In Proceedings of the 15th IEEE Computer Security Foundations Workshop (CSFW 2002), Jun. 2002 (15 pages).

Steven Noel et al., "Correlating Intrusion Events and Building Attack Scenarios Through Attack Graph Distances", in Proceedings of the 20th Annual Computer Security Applications Conference 2004, pp. 350-359, Dec. 6-10, 2004.

Lingyu Wang et al., "An Efficient and Unified Approach to Correlating, Hypothesizing, and Predicting Intrusion Alerts", In Proceedings of the 10th European Symposium on Research in Computer Security (ESORICS 2005), LNCS 3679, pp. 247-266, Sep. 2005.

Lingyu Wang et al., "Using Attack Graphs for Correlating, Hypothesizing, and Predicting Intrusion Alerts", Computer Communications, vol. 29, No. 15, pp. 2917-2933, Sep. 2006.

M. Dacier, "Towards Quantitative Evaluation of Computer Security", Ph.D. Dissertation, Institut National Polytechnique de Toulouse (1994).

\* cited by examiner

FIGURE 7

*ForwardSearch(G,k)*

Input: Attack graph $G = (E \cup C, R_o \oplus R_c)$, and optimization parameter $k$.
Output: Mapping $\sigma : C \cup E \to 2^S$, and mapping $minCost : C \cup E \to \mathbb{R}^+$.

1: $Q \leftarrow TopologicalSort(C \cup E)$
2: while $Q \neq \emptyset$ do
3:   $q \leftarrow Q.pop()$
4:   if $q \in C_s$ then
5:     $sigma(q) \leftarrow \{\{A\} \mid q \in A\}$
6:   else if $q \in E$ then
7:     $sigma(q) \leftarrow \bigcup_{c \in C \mid (c,q) \in R_c} sigma(q)$
8:   else if $q \in C \setminus C_s$ then
9:     $\{v_1, \ldots, v_m\} \leftarrow \{e \in E \mid (e, q) \in R_o\}$
10:     $sigma(q) \leftarrow \{S_1 \cup \ldots \cup S_m \mid S_i \in sigma(v_i)\}$
11:   end if
12:   $sigma(q) \leftarrow topK(sigma(q), k)$
13:   $minCost(q) = \min_{S \in sigma(q)} cost(S)$
14: end while

METHODS AND SYSTEMS FOR DETERMINING HARDENING STRATEGIES

CROSS-REFERENCE TO RELATED APPLICATIONS

This application claims the benefit of U.S. Provisional Application No. 61/738,528, filed Dec. 18, 2012, which is incorporated by reference in its entirety.

BRIEF DESCRIPTION OF THE DRAWINGS

FIG. 7 is an algorithm ForwardSearch, according to an embodiment of the invention.

DETAILED DESCRIPTION OF SEVERAL EMBODIMENTS

Attack graph analysis may be used to help analyze network vulnerability. Once an attack graph of conditions and/or exploits (e.g., at least one goal condition, at least one initial condition, at least one exploit) is obtained, allowable actions that may harden the conditions may be obtained. Costs associated with the allowable actions may also be obtained. Recommended actions to harden the network with respect to one or more goal conditions may be determined.

Systems and methods described herein may comprise one or more computers. A computer may be any programmable machine or machines capable of performing arithmetic and/or logical operations. In some embodiments, computers may comprise circuits, integrated circuits, processors, memories, data storage devices, and/or other commonly known or novel components. These components may be connected physically or through network or wireless links. Computers may also comprise software which may direct the operations of the aforementioned components. Computers may be referred to with terms that are commonly used by those of ordinary skill in the relevant arts, such as servers, PCs, mobile devices, routers, switches, data centers, distributed computers, and other terms. Computers may facilitate communications between users and/or other computers, may provide databases, may perform analysis and/or transformation of data, and/or perform other functions. It will be understood by those of ordinary skill that those terms used herein are interchangeable, and any computer capable of performing the described functions may be used.

Computers may be linked to one another via a network or networks. A network may be any plurality of completely or partially interconnected computers wherein some or all of the computers are able to communicate with one another. It will be understood by those of ordinary skill that connections between computers may be wired in some cases (e.g., via Ethernet, coaxial, optical, or other wired connection) or may be wireless (e.g., via Wi-Fi, WiMax, or other wireless connection). Connections between computers may use any protocols, including connection oriented protocols such as TCP or connectionless protocols such as UDP. Any connection through which at least two computers may exchange data can be the basis of a network.

Figure 1:
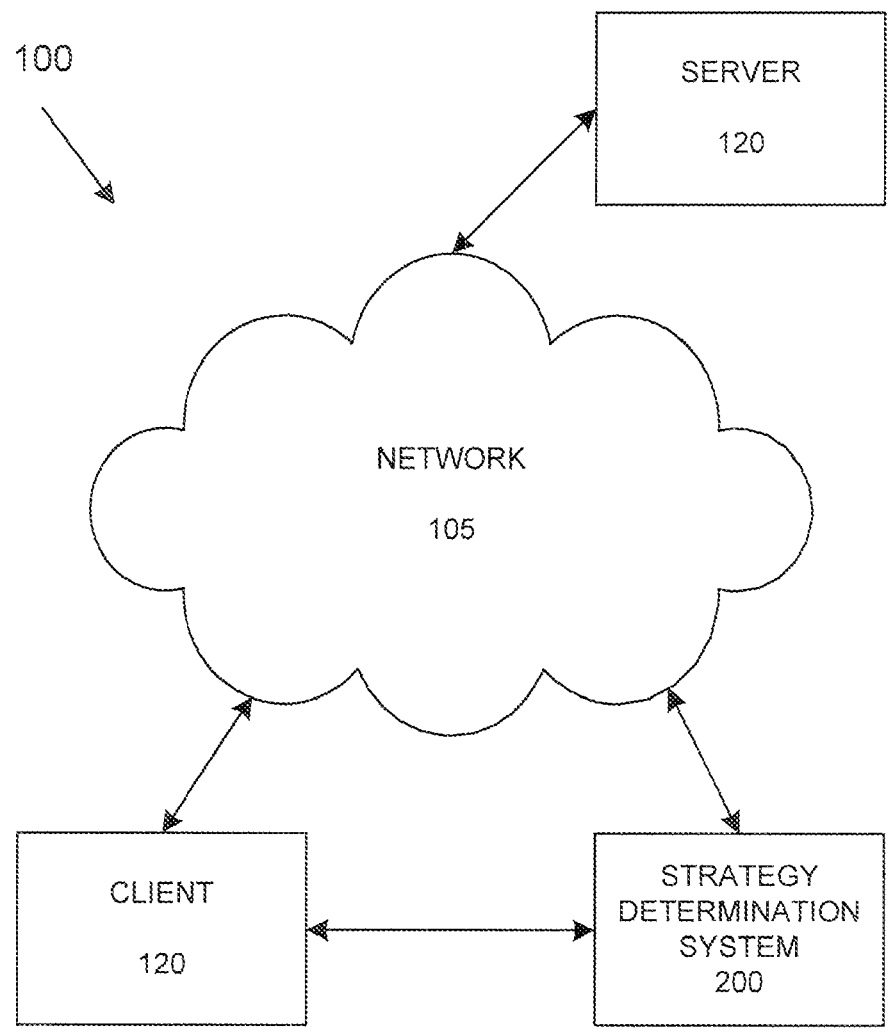
FIG. 1 is a system 100 according to an embodiment of the invention.

FIG. 1 is a system 100 according to an embodiment of the invention. In this example, the system 100 may comprise a network 105 (e.g., the Internet, an intranet) wherein one or more computers 120 (e.g., server, client) may communicate with one another. As will be described in greater detail below, a strategy determination system 200 may communicate with the client and/or the server.

The strategy determination system 200 may obtain an attack graph of conditions and/or exploits (e.g., using known techniques), obtain allowable actions that may remove one or more initial conditions to harden the network with respect to one or more goal conditions; obtain costs associated with the allowable actions, and determine recommended hardening strategies to efficiently harden the network with respect to the goal condition(s), each hardening strategy consisting of one or multiple allowable actions. As attackers may leverage complex interdependencies of network configurations and vulnerabilities to penetrate seemingly well-guarded networks, in an embodiment, the recommended actions may consider attacker exploits in isolation and/or in combination. Attack graphs may reveal such threats by enumerating potential paths that attackers can take to penetrate networks. This may help determine whether a given set of network hardening measures provides safety for given critical resources.

In an embodiment, the network may be hardened using a strategy comprising a single allowable action. In another embodiment, the network may be hardened using a strategy comprising a combinations of allowable actions, because, for example, network administrators may take a set of actions that affect vulnerabilities across the network (e.g., such as pushing patches out to many systems at once), thus effectively preventing all attack paths leading to the goal condition(s). Furthermore, the same hardening result may be obtained through more than one hardening strategy.

Hardened goal conditions may have a corresponding impact on removing paths in the attack graph. In addition, hardening solutions that are optimal with respect to some notion of cost and/or time may be determined. Such hardening solutions prevent the attack from succeeding, while minimizing the associated costs. Furthermore, in applying network hardening to realistic network environments, it is helpful if algorithms are able to scale. Additionally, suboptimal solutions may be helpful because they are practical.

Because computing the minimum-cost hardening solution is intractable, an approximation algorithm that may generate suboptimal solutions efficiently may be used. This algorithm may find cost-effective and time-effective near-optimal solutions while scaling almost linearly, for certain values of the parameters, with the size of the attack graph.

Figure 2:
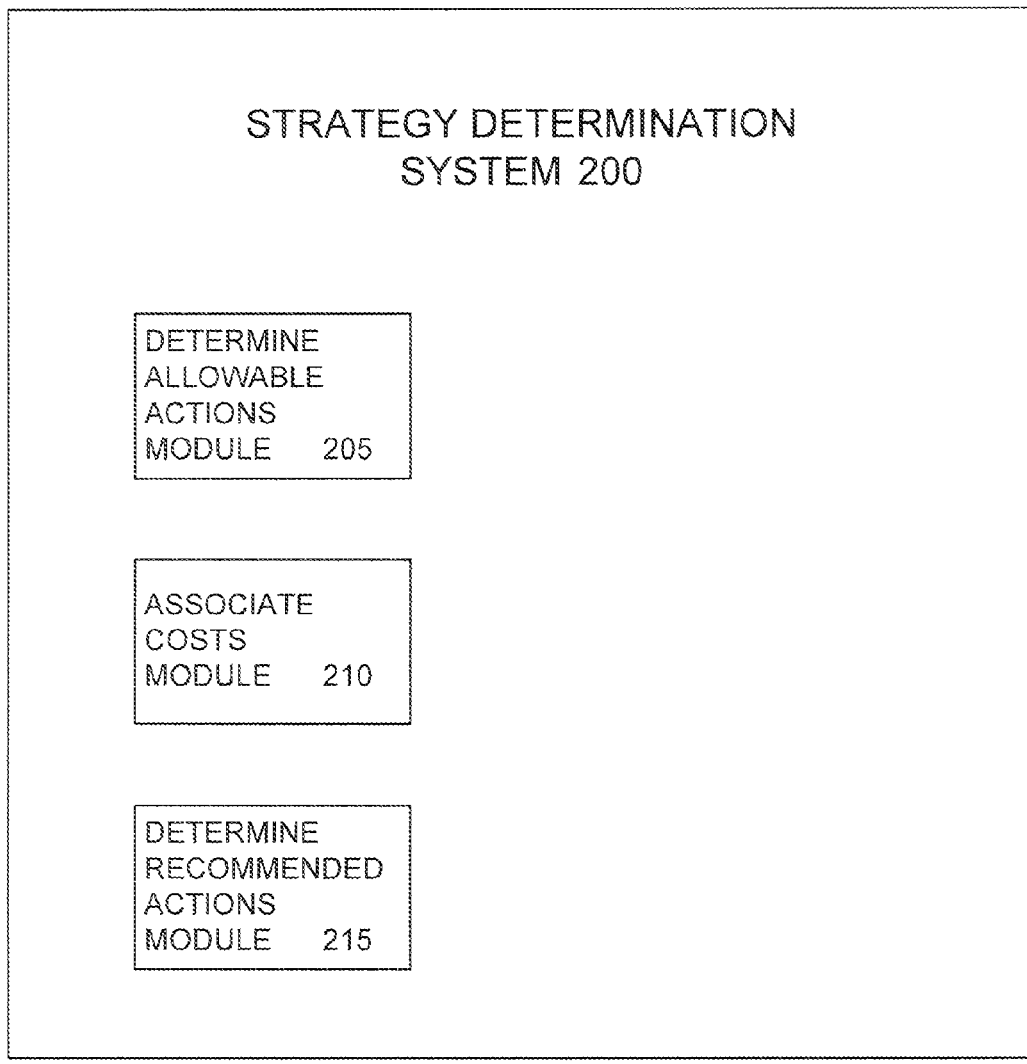
FIG. 2 is a strategy determination system 200, according to an embodiment of the invention.

FIG. 2 is a strategy determination system 200, according to an embodiment of the invention. The strategy determination system 200 may comprise one or more computers and various modules which may perform the tasks described in greater detail below. For example, the strategy determination system 200 may comprise: a determine allowable actions module 205; an associate costs module 210; a determine recommended actions module 213; or an approximation module; or any combination thereof.

Figure 3:
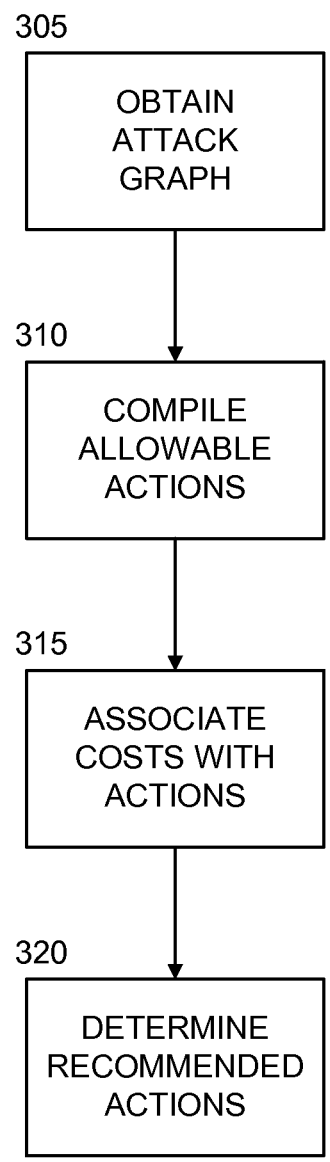
FIG. 3 is a strategy determination method 300, according to an embodiment of the invention.

FIG. 3 is a strategy determination method 300, according to an embodiment of the invention. In 305, an attack graph comprising conditions and/or exploits may be obtained. In 310, allowable actions that remove one or more initial conditions may be obtained. In 315, costs associated with the allowable actions may be obtained. In 320, recommended strategies comprising allowable actions may be determined based upon costs and/or time constraints.

With respect to 305, an attack graph tool, such as, but not limited to, CAULDRON™ may be utilized: (For more information on CAULDRON™, see S. Jajodia et al., "Cauldron: Mission-centric cyber situational awareness with defense in depth," in *Proceedings of the Military Communications Conference* (MILCOM 2011), Baltimore, Md., USA, November 2011, which is herein incorporated by reference in its entirety.)

In an embodiment, an attack graph may be defined as follows: Definition 1 (Attack graph): Given a set of exploits E, a set of security conditions C, a require relation $R_r \subseteq C \times E$, and an imply relation $R_i \subseteq E \times C$, an attack graph G is the directed graph $G = (E \cup C, R_r \cup R_i)$, where $E \cup C$ is the vertex set and $R_r \cup R_i$ the edge set.

In an embodiment, an exploit may be denoted as a predicate $v(h_s, h_d)$, indicating an exploitation of vulnerability v on the destination host $h_d$, initiated from the source host h. Similarly, v(h) may represent exploits involving only local host h.

In an embodiment, a security condition may be a predicate $c(h_s, h_d)$ that indicates a satisfied security-related condition c involving the source host h, and the destination host $h_d$ (when a condition involves a single host, it may be denoted as c(h)). Examples of security conditions may comprise the existence of a vulnerability on a given host or the connectivity between two hosts. Initial conditions (e.g., shown in FIGS. 4, 5, and 6 as ovals with dashed lines) may be a special subset of security conditions, as defined as follows: Definition 2 (initial conditions): Given an attack graph $C = (E \cup C, R_r \cup R_i)$, initial conditions refer to the subset of conditions $C_i$ {c∈C | ∄e∈E s.t. (e, c)∈$R_i$}, whereas intermediate conditions refer to the subset $C \setminus C_i$. (Intermediate conditions (e.g., shown in FIGS. 4, 5 and 6 as solid ovals) are usually consequences of exploits and hence cannot be disabled without removing the causes. Initial conditions, by contrast, are not created through the execution of exploits, and thus might be removed.)

Figure 4:
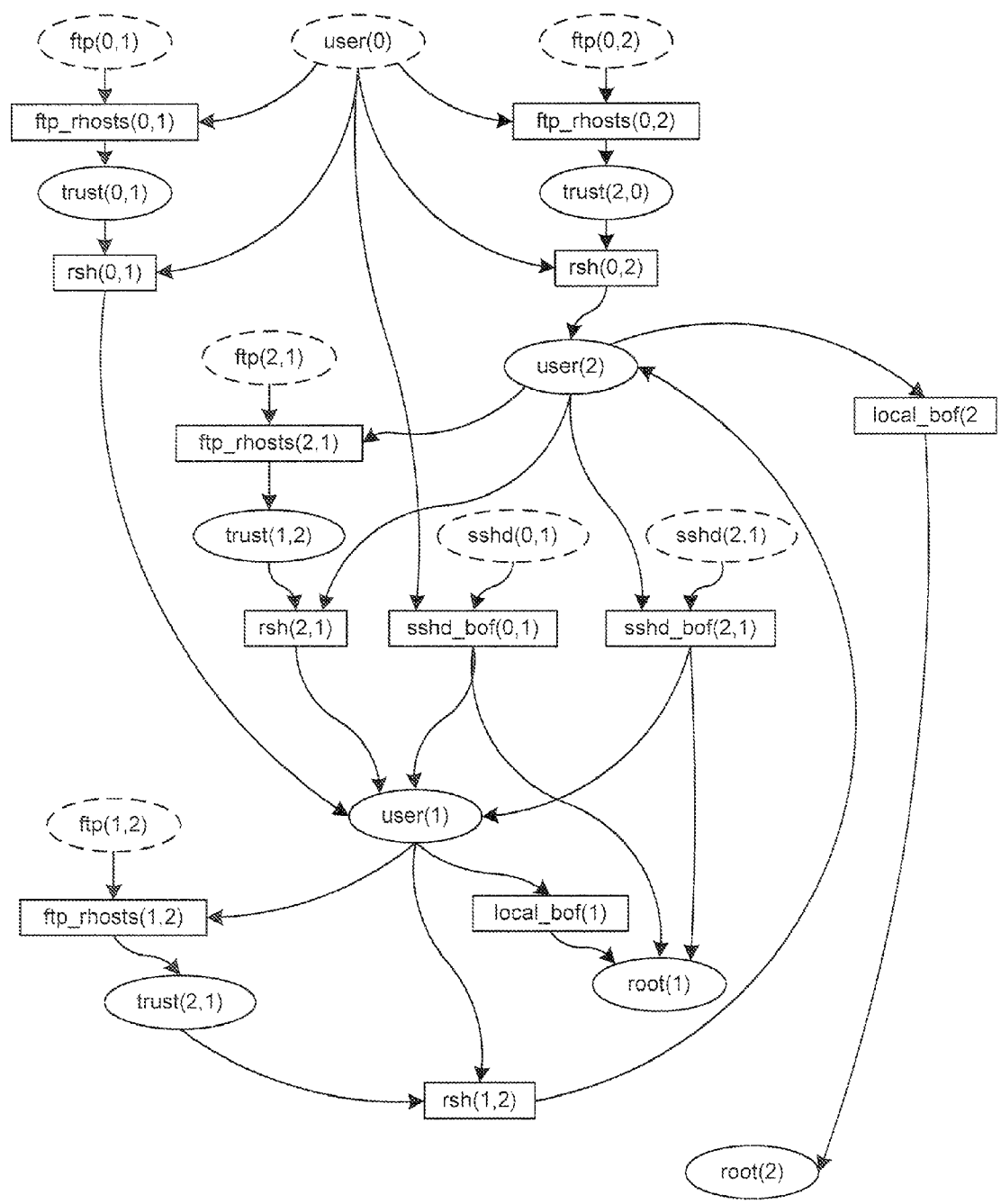
FIGS. 4-6 and 8-9 depict examples of attack graphs, with exploits appearing as rectangles and conditions as ovals, according to an embodiment of the invention.

FIG. 4 depicts an example of attack graph, with exploits appearing as rectangles and conditions as ovals. In this example, it may be assumed that the objective is to harden the network with respect to target condition root (e.g., to prevent the attacker from gaining root privileges on host 2). The scenario depicted in FIG. 4 is relatively simple, with three hosts—denoted host 0, 1, and 2 respectively and four types of vulnerabilities—ftp_rhosts, rsh sshd_bof and local_bof. However, because multiple interleaved attack paths can lead to the goal condition, an optimal solution to harden the network is still not apparent from the attack graph itself, and finding such a solution by hand may not be trivial. As an example of attack path, the attacker can first establish a trust relationship from his machine (host 0) to host 2 (condition trust(2,0)) via the exploit ftp_rhosts(0,2) on host 2, then gain user privileges on host 2 (condition user(2)) with an rsh login (exploit rsh(0,2)), and finally achieve the goal condition root (2) using a local buffer overflow attack on host 2 (exploit local_bof(2)). The following are some of the valid attack paths that can be generated using existing algorithms.

ftp_hosts(0,2), rsh(0,2), local_bof(2)

ftp_rhosts(0, 1), rsh(0,1), ftp_rhosts(1,2), rsh(1,2), local_bof(2)

sshd_bof(0,1), ftp_rhosts(1,2), rsh(1,2), local_bof(2)

Intuitively, to prevent the goal condition from being satisfied, a solution to network hardening must break all the attack paths leading to the goal. This intuition was captured by the concept of critical set, that is, a set of exploits (and corresponding conditions) whose removal from the attack graph will invalidate all attack paths. It has also been shown that finding critical sets with the minimum cardinality is NP-hard, whereas finding a minimal critical set (that is, a critical set with no proper subset being a critical set) is polynomial. Based on the above attack paths, there are many minimal critical sets, such as {rsh(0,2), rsh(1,2)}, ftp_hosts(0,2), rsh(1,2)), {ftp_rhosts(1,2), rsh(0,2)}, and so on. If any of those sets of exploits could be completely removed, all the attack paths become invalid, and hence the goal condition is safe. Unfortunately, the above solution ignores the following important fact. Not all exploits are under the direct control of administrators. An exploit can only be removed by disabling its required conditions, but not all conditions can be disabled at will. Intuitively, a consequence cannot be removed without removing its causes. Some conditions are implied by other exploits. Such intermediate conditions cannot be independently disabled without removing the exploits that imply them. Only those initial conditions that are not implied by any exploit can be disabled independently of other exploits. Hence, in an embodiment, one can distinguish between these two kinds of conditions, as formalized in Definition 2.

For instance, in FIG. 4, exploit rsh(1,2) cannot be independently removed, because the two conditions it requires, trust (2,1) and user(1), are both intermediate conditions and cannot be independently disabled. As long as an attacker can satisfy those two conditions through other exploits (for example ftp_rhosts(1,2) and sshd_bof(2,1)), the realization of the exploit rsh(1,2) is unavoidable. Hence, any of the above minimal critical sets, such as {rsh(0,2), rsh(1,2)}, is theoretically a sound solution, but may not be practically enforceable. For the attack graph of FIG. 4, two solutions may be returned: {ftp(0,2), ftp(1,2)} and {ftp(0,2), ftp(0,1), sshd(0,1)}. At this point, there is no clear procedure to decide which solutions has the minimum cost, unless the assumption is made that the cost of removing each individual condition is assigned by administrators. Intuitively, one may expect the solution {ftp (0,2), ftp(1,2)} to have a lower cost than {ftp(0,2), ftp(0,1), sshd(0,1)}, as fewer conditions need to be disabled. However, removing both ftp(0,2) and ftp(1,2) may only be possible if the ftp service on host 2 is shut down. This action may have a considerable cost in terms of disruption to legitimate users. In this case, the combined cost of removing the conditions {ftp (0,2), ftp(0,1), sshd(0,1)} may be lower, as it may be achieved by simply blocking all traffic from host 0.

Figure 5:
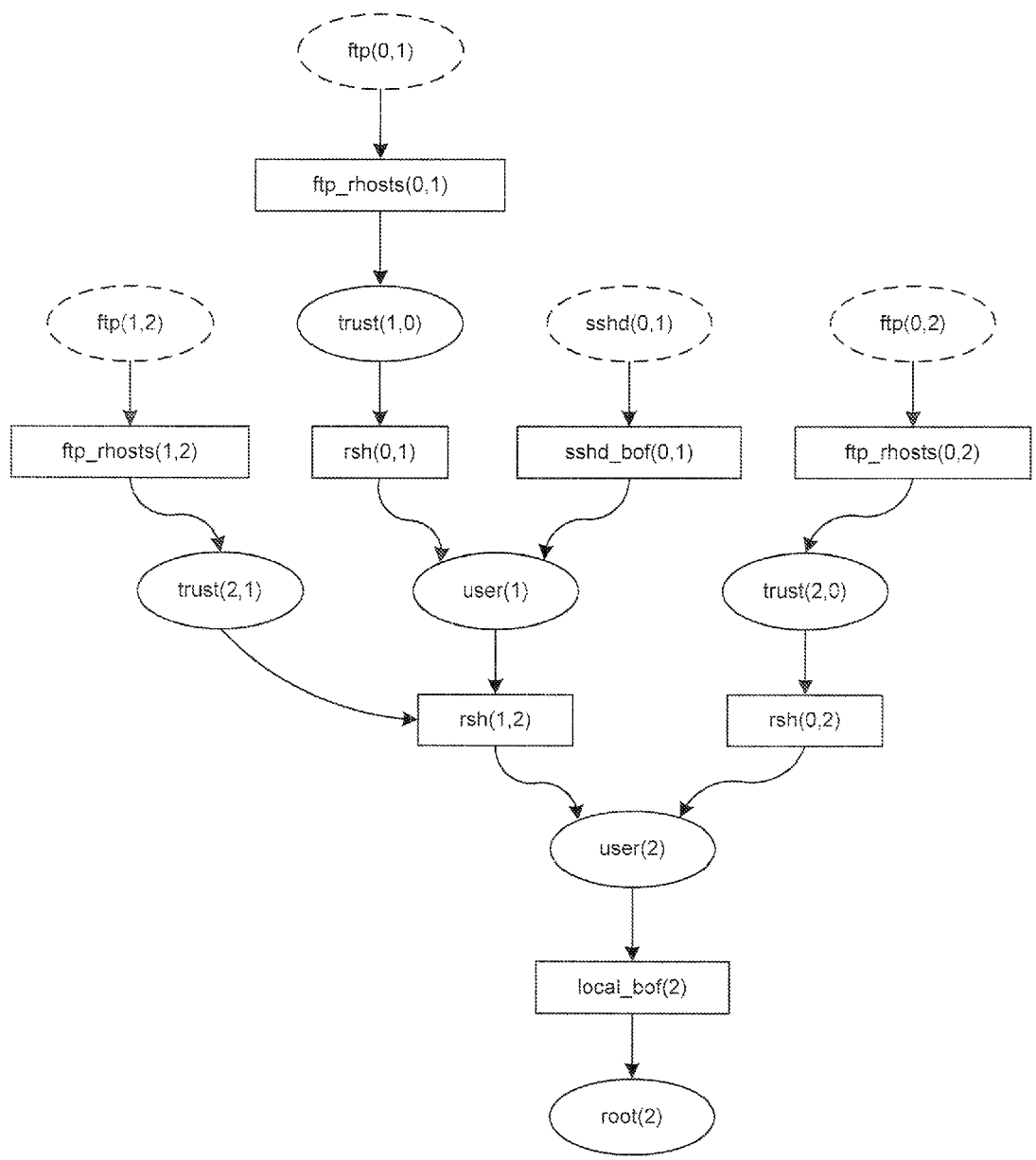

FIG. 5 illustrates a simplified graph that may be created using, for example, a backward traversal algorithm. (More information on an example backward traversal algorithm may be found in L. Wang et al., "Minimum-cost network hardening using attach graphs," Computer Communications, Vol. 29, no. 18, pp. 3812-3824, November 2006, which is incorporated by reference in its entirety.) Note that the attack graph of FIG. 4 has the same hardening solutions as the simplified attack graph of FIG. 5. This is possible because the algorithm traverses the graph from target conditions to initial conditions, and, relying on the monotonicity assumption, breaks all the cycles. Intuitively, from the point of view of a target condition, the attack graph can be seen as a tree rooted at the target condition and having initial conditions as the leaf nodes. In fact, a condition may be implied by one or more exploits. In turn, each such exploits need one or more preconditions to be executed. This observation may be leveraged in determining the recommended actions from the allowable actions, as explained with respect to the details of 320 set forth below.

Referring back to 310 of FIG. 3, where allowable actions that harden the conditions may be obtained, a determine allowable actions module 205 may be utilized to obtain the allowable actions. In an embodiment, administrators may manually enter actions that are allowed. In another embodiment, this process may be automated.

Disabling a set of initial conditions in order to prevent attacks on given targets may result in undesired effects such as denial of service to legitimate users. These effects are greatly amplified when initial conditions cannot be individually disabled, but rather require actions that disable a larger number of conditions. In the following, a network hardening strategy is defined as a set of atomic actions that can be taken to harden a network. For instance, an allowable hardening action may consist in stopping ftp service on a given host. Thus, each action may have additional effects besides disabling a desired condition. Such effects may be taken into account when computing minimum-cost solutions. For instance, in the attack graph of FIG. 4, disabling ftp(1,2) might not be possible without also disabling ftp(0,2). Definition 3 (Allowable hardening action) Given an attack graph $G=(E \cup C, R_r \circ R_i)$, an allowable hardening action (or simply hardening action) A is any subset of the set C, of initial conditions such that all the conditions in A can be jointly disabled in a single step, and no other initial condition $c \in C_i \backslash A$ is disabled when conditions in A are disabled.

Figure 6:
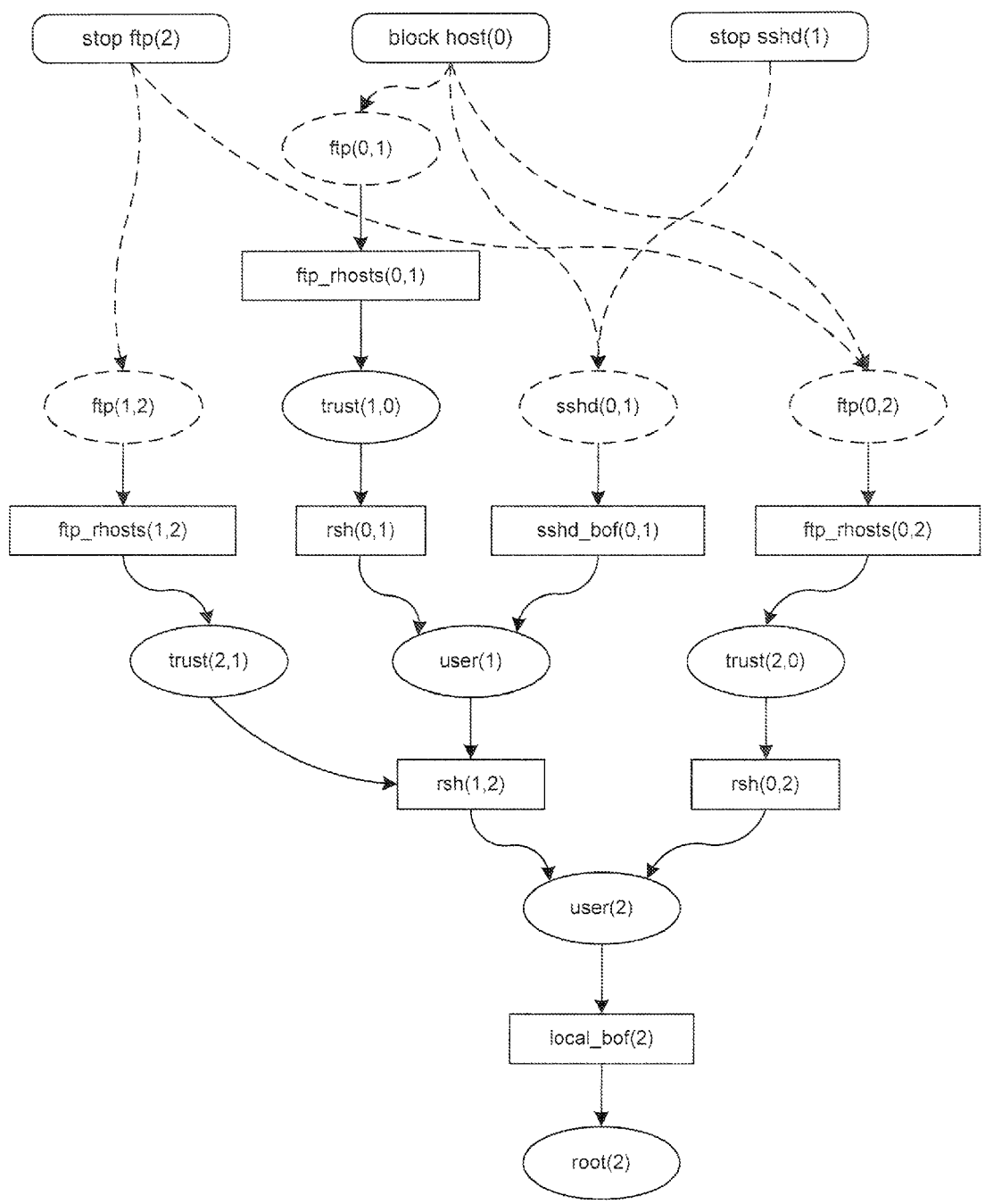

A hardening action A is said to be minimal if and only if $\not\exists A^* \subset A$ s.t. $A^*$ is an allowable hardening action. A may be used to denote the set of all possible hardening actions. FIG. 6 depicts the same attack graph of FIG. 5, but it explicitly shows the allowable hardening actions, represented as rounded rectangles. Dashed edges indicate which conditions are disabled by each action. Intuitively, a network hardening action may be an atomic step p that network administrators may take to harden the network (e.g., closing an ftp port). When an action A is taken, exactly all the conditions in A may be removed. In the example of FIG. 6, A={stop_ftp(2), block_host(0), stop_sshd(1)}, stop_ftp(2)={ftp(0,2), ftp(1,2)}, block_host(0)={ftp(0,1), sshd(0,1), ftp(0,2)}; and stop_sshd(1)={sshd(0,1)}. In this example, the condition ftp (1,2) cannot be individually disabled, and can only be disabled by taking action stop_ftp(2), which also disables ftp(0, 2).

Therefore, when choosing a set of initial conditions to be removed in order to prevent attacks on given targets, all the implications of removing those conditions may be taken into account. Removing specific initial conditions may require actions to be taken that disable additional conditions, including conditions not explicitly modeled in the attack graph, such as conditions that are not part of any attack path. To address this problem, the notion of hardening strategy in terms of allowable actions may be used, and a cost model that takes into account the impact of hardening actions may be defined. This approach may improve the state of the art, while preserving the key idea that solutions are truly enforceable only if they operate on initial conditions.

In this embodiment, the assumption that initial conditions can be individually disabled is dropped. In the framework, this simplifying assumption corresponds to the special case where, for each initial condition, there exists an allowable action that disables that condition only, i.e., $(\forall c \in C_i)\exists A \in A)$ A={c}. The notion of network hardening strategy in terms of allowable actions may be defined as follows: Definition 4 (Network hardening strategy): Given an attack graph $C=(E \cup C, R_r \circ R_i)$, a set A of allowable actions, and a set of target conditions $C_1 = \{c_1, \ldots, c_n\}$ a network hardening strategy (or simply hardening strategy) S is a set of network hardening, actions $\{A_1, \ldots, A_m\}$ s.t. conditions $c_1, \ldots, c_n$ cannot be reached after all the actions in S have been taken. S denotes the set of all possible strategies, and C(S) denotes the set of all the conditions disabled under strategy S, i.e., $C(S) = \cup_{A \in S} A$.

Referring to 315 of FIG. 3, where costs may be associated with the allowable actions, an associated costs model 210 may be utilized. In an embodiment, administrators may manually enter in costs associated with the allowable actions. In another embodiment, this process may be automated. For example, the administrators may choose from one or more templates of associated costs. As explained above, a hardening strategy may be a set of allowable actions breaking all attack paths leading to the target conditions. A hardening cost model may be used to associate costs with the hardening strategies by combining costs of individual actions, thus enabling a more accurate analysis of available hardening options: Definition 5 (Hardening cost function): A hardening cost function may be any function cost: $S \rightarrow \mathbb{R}^+$ that satisfies the following axioms:

$$\text{cost}(\emptyset) = 0 \tag{1}$$

$$(\forall S_1, S_2 \in S)(C(S_1) \subseteq C(S_2) \Rightarrow \text{cost}(S_1) \leq \text{cost}(S_2)) \tag{2}$$

$$(\forall S_1, S_2 \in S)(\text{cost}(S_1 \cup S_2) \leq \text{cost}(S_1) + \text{cost}(S_2)) \tag{3}$$

In other words, the above definition requires that (i) the cost of the empty strategy—the one not removing any condition—is 0: (ii) if the set of conditions disabled under $S_1$ is a subset of the conditions disabled under $S_2$, then the cost of $S_1$ is less than or equal to the cost of $S_2$ (monotonicity); and (iii) the cost of the combined strategy $S_1 \cup S_2$ is less than or equal to the sum of the individual costs of $S_1$ and $S_2$ (triangular inequality).

Combining the three axioms above, it can be concluded that $(\forall S, S_2 \in S)(0 \leq \max (\text{cost}(S_1), \text{cost}(S_2)) \leq (\text{cost}(S_1 \cup S_2) \leq \text{cost}(S_1) + \text{cost}(S_2)$.

A cost function is said to be additive if and only if the following additional axiom is satisfied:

$$(\forall S_1, S_2 \in S)(S_1 \cup S_2 = \emptyset \leftrightarrow \text{cost}(S_1) + \text{cost}(S_2) = \text{cost}(S_1 \cup S_2)) \tag{4}$$

Many different cost functions may be defined. The following is an example of a very simple cost function:

$$\text{cost}_\alpha(S) = |C(S)| \tag{5}$$

The above cost function may simply count the initial conditions that are removed under a network hardening strategy S, and clearly satisfies the three axioms of Definition 5. If actions in A are pair wise disjoint, then $\text{cost}_\alpha$ may also be additive.

Referring to 320 of FIG. 3, where recommended actions from the allowable actions may be determined based upon costs and/or time constraints, a determination recommended actions module 215 may be utilized using a forward search algorithm. The forward search algorithm may quickly compute reasonably good solutions. Under certain conditions, the solutions computed by the proposed algorithm may have a cost that is bound to be within a constant factor of the optimal cost.

Algorithm ForwardSearch, set forth in FIG. 7, traverses the attack graph forward, starting from initial conditions. Traversing the attack graph forward may show that intermediate solutions are indeed network hardening strategies with respect to intermediate conditions. In fact, in a single pass, Algorithm ForwardSearch can compute hardening strategies with respect to any condition in C. To limit the exponential explosion of the search space, intermediate solutions can be pruned, based on some pruning strategy, whereas pruning may not possible for the algorithm that traverses the graph backwards. In fact, in this case, intermediate solutions may contain exploits and intermediate conditions and cost information may not be able to be determined until all the exploits and intermediate conditions have been replaced with sets of initial conditions.

In this section, for ease of presentation, hardening problems are considered with a single target condition. The generalization to the case where multiple target conditions need to be hardened at the same time is straightforward and is discussed below.

Figure 8:
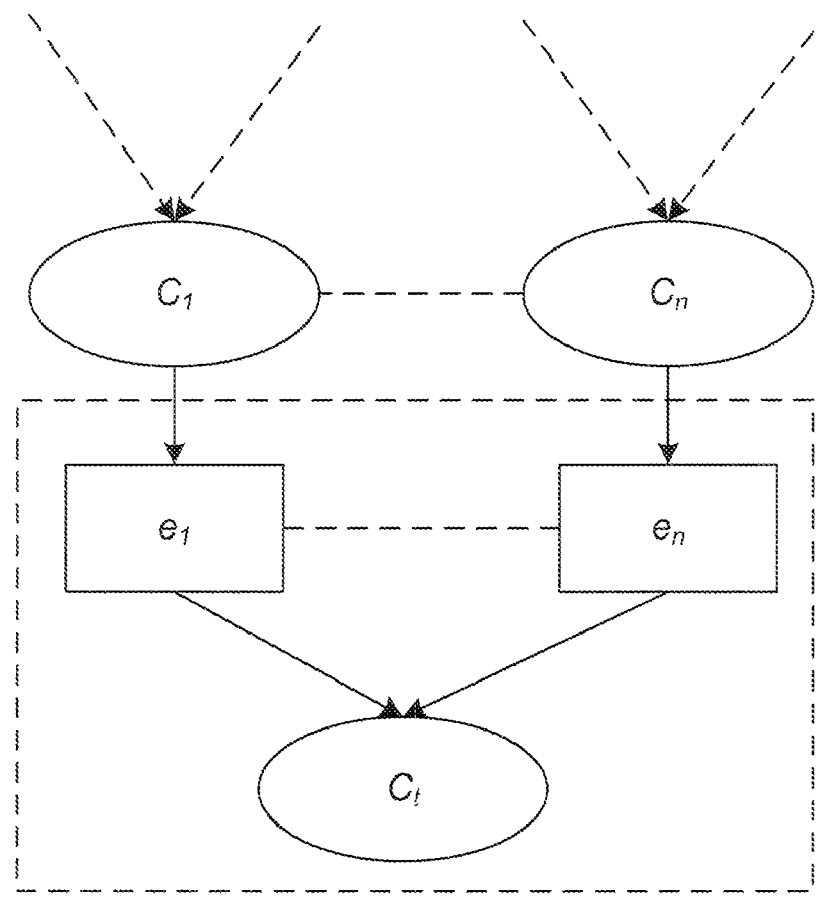

Given a set $C_t$ of target conditions, a dummy exploit $e_i$ for each condition $c_i \in C_t$ may be added, such that $e_i$ has $c_i$ as its precondition, as shown in FIG. 8. Then, a dummy target condition $c_t$ may be added, such that all the dummy exploits $e_i$ have $c_t$ as their postcondition. It is clear that any strategy that hardens the network with respect to $c_t$ implicitly hardens the network with respect to each $c_i \in C_t$. In fact, as $c_t$ is reachable from any dummy exploit $e_i$, all such exploits may need to be prevented, and the only way to achieve this is by disabling the corresponding preconditions, that is hardening the network with respect to all target conditions in $C_t$.

Additionally, it may be assumed that, given a target condition c the attack graph may be a tree rooted at $c_t$ and having initial conditions as leaf nodes. If the attack graph is not a tree, it can be converted to this form. (See, for example, FIG. 5 and its accompanying description.) Looking at the attack graph from the point of view of a given target condition may have the additional advantage of ignoring exploits and conditions that do not contribute to reaching that target condition.

On Line 1 of FIG. 7, the forward search algorithm may perform a topological sort of the nodes in the attack graph (exploits and security conditions), and push them into a queue, with initial conditions at the front of the queue. While the queue is not empty, an element q may be popped from the queue. If q is an initial condition, then q may be associated with a set of strategies such that each strategy simply contains one of the allowable actions in A disabling q (Line 5 of FIG. 7). If q is an exploit, then q may be associated with a set of strategies that is the union of the sets of strategies for each condition c required by q (Line 7 of FIG. 7). In fact, an exploit can be prevented by disabling any of its required conditions. Finally, if q is an intermediate condition, then q may be associated with a set of strategies such that each strategy is the union of a strategy for each of the exploits that imply q (Lines 9-10 of FIG. 7). In fact, in order to disable an intermediate condition, all the exploits that imply it may need to be prevented. When suboptimal solutions are acceptable, then only the best k intermediate solutions may be maintained at each step of the algorithm (Line 12 of FIG. 7), and the minimal hardening cost for the current node may be computed accordingly (Line 13 of FIG. 7).

Example 1

Consider the attack graph of FIG. 6. The only three allowable actions on the corresponding network are stop_ftp(2)={ftp(1,2)}={ftp(1,2), block_host(0)={ftp(0,1), sshd(0,1), ftp(0,2)}, and stop_sshd(1)={sshd(0,1)} Assume that cost({stop_ftp(2)})=20, cost({block_host(0)})=10, and cost ({stops_shd(1)})=15. It is clear that the optimal strategy to harden the network with respect to root(2) is S={block_host(0)}, with a cost of 10. With respect to the behavior of the algorithm for k=1, all nodes may be added to the queue in topological order, and initial conditions are examined first. After all the initial conditions have been examined, the following may be obtained: σ(ftp(1, 2))={{stop_ftp{2}}}, σ(ftp(0,1))={{block_host(0)}}, σ(sshd(0,1))={block_host(0), and (ftp(0, 2)) block_host(0)}} Once the algorithm examines exploit rsh(1,2), on Line 7 of FIG. 7, before pruning, the following may be obtained: σ(rsh(1,2))={{stop_ftp(2)}, {block_host(0)}} After pruning (Line 12 of FIG. 7), the following may be obtained: σ(rsh(1,2))={{block_host(0)}}, as {block_host(0)} is the strategy with the lowest cost. Finally, the following may be obtained: n (root (2))={{block_host(0)}}. That is the algorithm, in this case, returns the optimal solutions.

Now, a different example may be considered, which shows how the value of k may have an impact on the optimality of the solution. Intuitively, the higher the value of k, the closer the computed solution is to the optimal one.

Example 2

Figure 9:
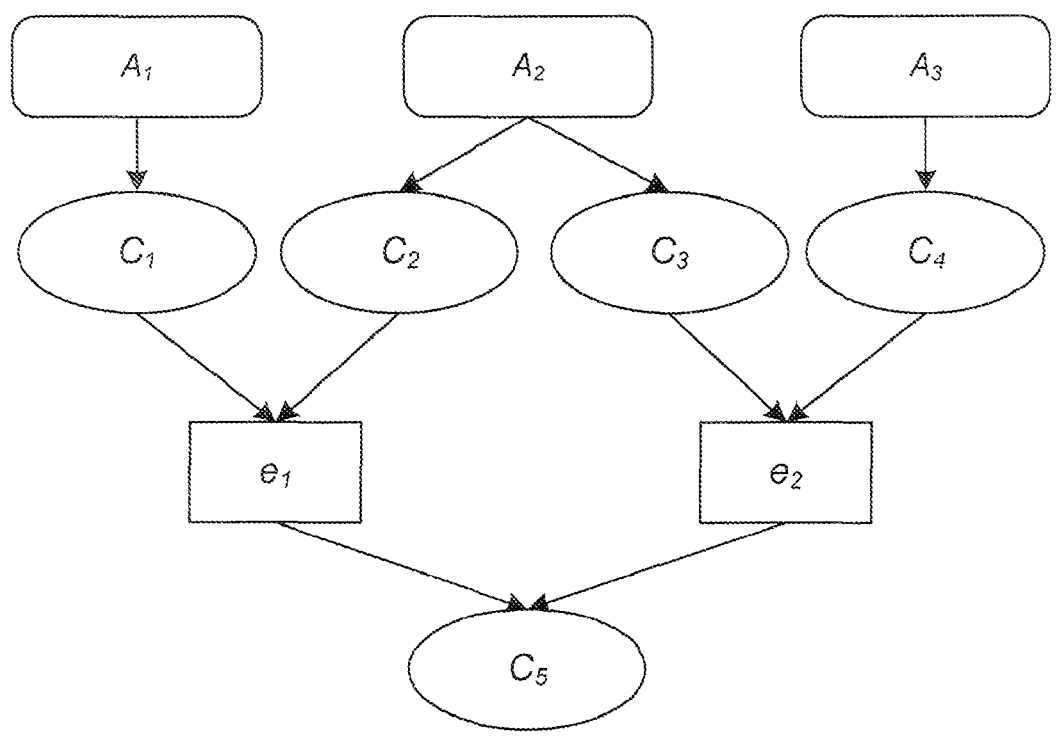

Consider the attack graph of FIG. 9, and assume that cost ({$A_1$})=10, cost({$A_2$})=18, and cost({$A_3$})=10. Also assume that cost is additive. It is clear that the optimal strategy to harden the network with respect to $c_5$ is S={$A_2$}, with a cost of 18. The behavior of the algorithm for k=1 may be considered. On Line 1 of FIG. 7, Q=($c_1,c_2,c_3,c_4,e_1,e_2,c_5$) may be obtained. Thus, $c_1$ may be the first node to be examined. After the first 4 elements of the queue have been examined, the following may be obtained: σ($c_1$)={{$A_1$}}, σ($c_2$)={{$A_2$}}, σ($c_3$)={{$A_2$}}, and σ($c_4$)={{$A_3$}}. Then $e_1$ may be considered. The full set of possible strategies for $e_1$ is σ($e_1$)={{$A_1$, $A_2$}}, but, since k=1, only the best one may be maintained and propagated to following steps. A similar consideration may be applied to $C_2$. In conclusion, the following is obtained: σ($e_1$)={{$A_1$} σ($e_2$)={{$A_3$}} Finally, the following may be obtained: σ($c_5$)={{$A_1,A_3$}}, and minCost($c_5$)=20. This may be slightly above the optimal cost. Similarly, it can be shown that, for k=2, the algorithm may return min Cost($c_5$)=18, i.e., the optimal solution. This may confirm that larger values of k make solutions closer to the optimal one.

In an embodiment, an upper bound may be determined to provide a worse case estimate of how much a recommended solution will cost. That is, an upper bound may be determined to cap how expensive the recommended solution is (which can be done quickly) compared to the optimal (e.g., cheapest) solution. In an embodiment, when k=1, the approximation ratio may be upper-bounded by nd/2. where n is the number of incoming edges for a node, and d is the depth of the attack graph (e.g., the maximum distance between the initial condition(s) and the goal condition(s)). In some embodiments, in practice, the approximation ratio is much smaller than its theoretical bound. First, consider the type of scenario in which solutions may not be optimal. To this aim, consider again the attack graph configuration of FIG. 9. When computing solutions for $e_1$ and $e_2$ respectively, local decisions may be made without considering the whole graph (e.g., one can independently compute the optimal solution for e and the optimal solution for $e_2$, given hardening strategies for their preconditions). However, at a later stage, one may need to merge solutions for both $e_1$ and $e_2$ in order to obtain solutions for $c_5$. At this point, since there exists an allowable action (i.e., $A_2$) that would have disabled preconditions of both $e_1$ and $e_2$, with a cost lower than the combined cost of their locally optimal solutions, but the strategy including $A_2$ has been discarded for k=1, the solution is not optimal. This suggests that both k and the maximum in-degree ii of nodes in the graph play a role in determining the optimality of the solution. Additionally, as the algorithm traverses the graph towards target conditions, there may be a multiplicative effect in the approximation error. In fact, the depth d of the tree also may play a role in determining the outcome of the approximation, but this effect can be compensated by increasing the value of k.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments.

In addition, it should be understood that any figures which highlight the functionality and advantages are presented for example purposes only. The disclosed methodology and system are each sufficiently flexible and configurable such that they may be utilized in ways other than that shown.

Furthermore, although the term "at least one" may often be used in the specification, claims and drawings, the terms "a", "an", "the", "said", etc. also signify "at least one" or "the at least one" in the specification, claims and drawings. Additionally, the terms "including" and "comprising" in the specification, claims and drawings signify "including, but not limited to."

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

The invention claimed is:

1. A method for determining at least one recommended hardening strategy to prevent at least one attacker from reaching at least one target insecure condition on at least one unhardened network of computers, comprising:
   performing, by at least one processor circuit, processing associated with obtaining at least one attack graph, the at least one attack graph comprising at least one initial condition, the at least one target insecure condition, and at least one exploit;
   performing, by the at least one processor circuit, processing associated with obtaining at least one allowable hardening action that disables the at least one initial condition, the at least one allowable hardening action comprising at least one security-related change for security administrators to implement;
   performing, by the at least one processor circuit, processing associated with obtaining costs associated with the at least one allowable hardening action; and
   performing, by the at least one processor circuit, processing associated with determining the at least one recommended hardening strategy from the at least one allowable hardening action wherein the at least one recommended hardening strategy is controlled by adjusting a value of at least one parameter, wherein the at least one parameter is used in at least one algorithm that balances a time to determine the at least one recommended hardening strategy and a cost of the at least one recommended hardening strategy, the at least one recommended hardening strategy utilized to transform the at least one unhardened network of computers to at least one hardened network of computers by disabling the at least one target insecure condition.

2. The method of claim 1, further comprising:
   performing processing associated with using the at least one recommended hardening strategy to prevent the at least one attacker from reaching the at least one target insecure condition.

3. The method of claim 1, wherein each allowable action is associated with a cost.

4. The method of claim 1, wherein each recommended hardening strategy is associated with a cost.

5. The method of claim 1, wherein the determining the at least one recommended hardening strategy is done using a forward search algorithm.

6. The method of claim 5, wherein the forward search algorithm comprises:

---
ForwardSearch(G,k)

Input: Attack graph $G = (E \cup C, R_r \circ R_i)$, and optimization parameter k.
Output: Mapping $\sigma : C \cup E \to 2^S$, and mapping minCost : $C \cup E \to R^+$.
  1:  $Q \leftarrow$ Topological Sort($C \cup E$)
  2:  while $Q \neq \emptyset$ do
  3:      $q \leftarrow Q.pop\ ( )$
  4:      if $q \in C_i$ then
  5:          sigma(q) $\leftarrow \{\{A\} \mid q \in A\}$
  6:      else if $q \in E$ then
  7:          sigma(q) $\leftarrow \bigcup_{c \in C \mid (c,q) \in R_i}$ sigma(q)
  8:      else if $q \in C \setminus C_i$ then
  9:          $\{e_1, \ldots, e_m\} \leftarrow \{e \in E \mid (e,q) \in R_i\}$
 10:          sigma(q) $\leftarrow \{S_1 \cup \ldots \cup S_m \mid S_i \in$ sigma $(e_i)\}$
 11:      end if
 12:      sigma(q) $\leftarrow$ topK(sigma(q),k)
 13:      minCost(q) = $\min_{S \in sigma(q)}$ cost(S)
 14:  end while
---

7. The method of claim 1, wherein at least one upper bound is determined for the at least one recommended hardening strategy.

8. A system for determining at least one recommended hardening strategy to prevent at least one attacker from reaching at least one target insecure condition on at least one unhardened network of computers, comprising:
   at least one processor circuit in communication with at least one database, the at least one processor circuit configured for:
   performing processing associated with obtaining at least one attack graph, the at least one attack graph comprising at least one initial condition, the at least one target insecure condition, and at least one exploit;
   performing processing associated with obtaining at least one allowable hardening action that disables the at least one initial condition, the at least one allowable hardening action comprising at least one security-related change for security administrators to implement;
   performing processing associated with obtaining costs associated with the at least one allowable hardening action; and
   performing processing associated with determining the at least one recommended hardening strategy from the at least one allowable hardening action wherein the at least one recommended hardening strategy is controlled by adjusting a value of at least one parameter, wherein the at least one parameter is used in at least one algorithm that balances a time to determine the at least one recommended hardening strategy and a cost of the at least one recommended hardening strategy, the at least one recommended hardening strategy utilized to transform the at least one unhardened network of computers to at least one hardened network of computers by disabling the at least one target insecure condition.

9. The system of claim 8, further comprising:
   performing processing associated with using the at least one recommended hardening strategy to prevent the at least one attacker from reaching the at least one target insecure condition.

10. The system of claim 8, wherein each allowable action is associated with a cost.

11. The system of claim 8, wherein each recommended hardening strategy is associated with a cost.

12. The system of claim 8, wherein the determining the at least one recommended hardening strategy is done using a forward search algorithm.

13. The system of claim 12, wherein the forward search algorithm comprises:

| ForwardSearch(G,k) |
|---|
| Input: Attack graph $G = (E \cup C, R_r \circ R_i)$, and optimization parameter k. <br> Output: Mapping $\sigma : C \cup E \to 2^S$, and mapping minCost $: C \cup E \to R^+$. <br> 1:  Q ← Topological Sort(C ∪ E) <br> 2:  while Q ≠ ∅ do <br> 3:    q ← Q.pop ( ) <br> 4:    if q ∈ $C_i$ then <br> 5:      sigma(q) ← {{A} | q ∈ A} <br> 6:    else if q ∈ E then <br> 7:      sigma(q) ← $\cup_{c \in C \mid (c,q) \in R_i}$ sigma(q) <br> 8:    else if q ∈ C \ $C_i$ then <br> 9:      {$e_1, \ldots, e_m$} ← {e ∈ E | (e,q) ∈ $R_i$} <br> 10:     sigma(q) ← {$S_1 \cup \ldots \cup S_m$ | $S_i$ ∈ sigma($e_i$)} <br> 11:    end if <br> 12:    sigma(q) ← topK(sigma(q),k) <br> 13:    minCost(q) = $\min_{S \in sigma(q)}$ cost(S) <br> 14: end while. |

14. The system of claim 8, wherein at least one upper bound is determined for the at least one recommended hardening strategy.

* * * * *